Figure 1:
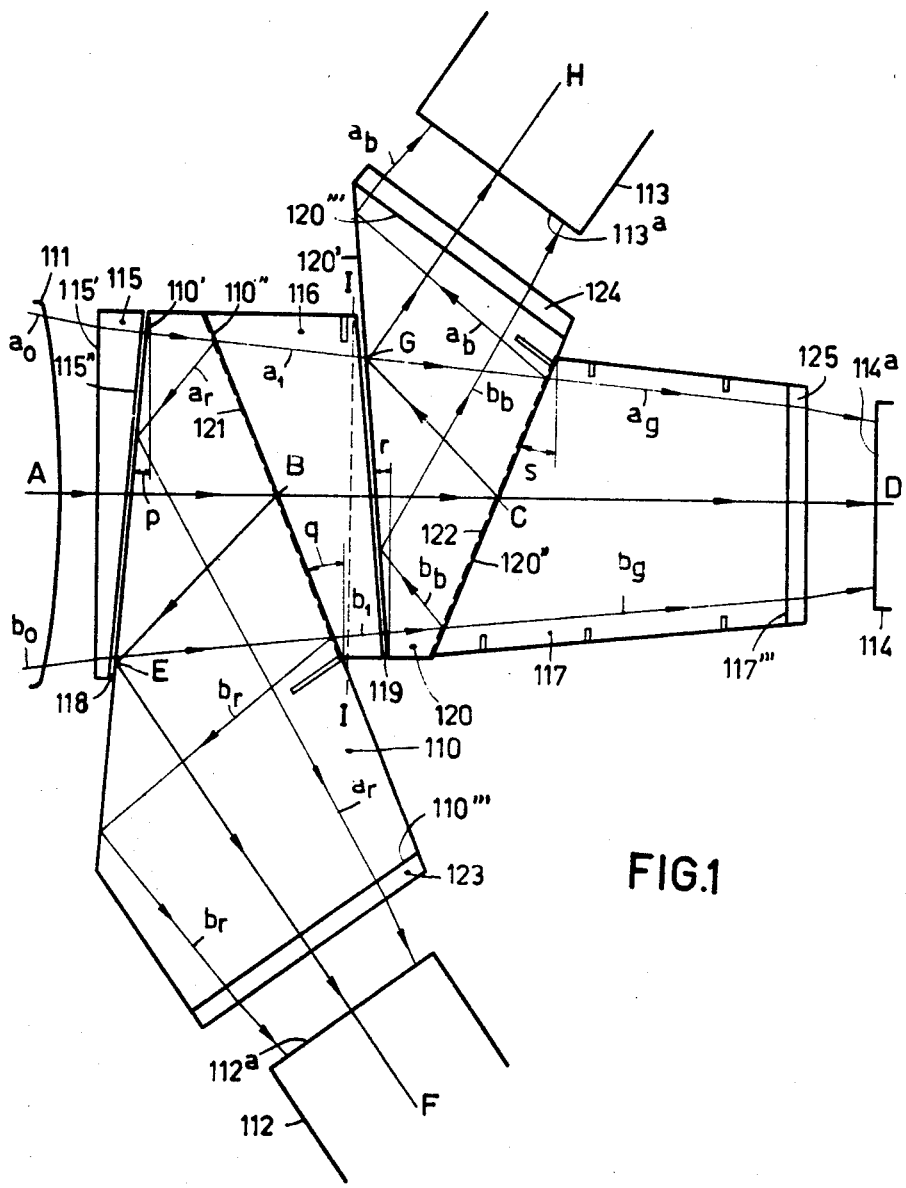

Aug. 24, 1965    H. DE LANG ETAL    3,202,039
OPTICAL SYSTEM FOR A COLOR TELEVISION CAMERA
Filed June 27, 1961    3 Sheets-Sheet 3

INVENTOR
HENDRIK DE LANG
BY GIJSBERTUS BOUWHUIS
AGENT 3,202,039
OPTICAL SYSTEM FOR A COLOR TELEVISION
CAMERA
Hendrik de Lang and Gijsbertus Bouwhuis, both of Emmasingel, Eindhoven, Netherlands, assignors to North American Philips Company, Inc., New York, N.Y., a corporation of Delaware
Filed June 27, 1961, Ser. No. 120,039
Claims priority, application Netherlands, Aug. 2, 1960, 254,460
10 Claims. (Cl. 88—1)

This invention relates to a television camera provided with a color separating prism system arranged behind the objective, which system has some surfaces which mutually adjoin differently colored dichroic layers. In this camera, the separated light beams emerging from the prism system are supplied to camera tubes. Such a camera is known. As is known, a dichroic layer has the property of passing definite spectral regions from the spectrum and reflecting others. When using some of such mutually differently colored dichroic layers for color separation, the light is split by two of these layers arranged one after the other, for example into red light, which is reflected by the first dichroic layer, into blue light which is reflected by the second layer and into green light which emerges from the prism system at the desired point without reflection at these layers. The known prism systems for this purpose often have the drawback that they occupy much space or also that, owing to an oblique incidence of the light on the dichroic layer, undesired polarisation phenomena of the light occur. In addition, in known prism systems for this purpose, the drawback sometimes occurs, that because of the geometry underlying the prism, the arrangement of the camera tubes gives rise to technical and construction difficulties.

The object of the present invention is to minimize these drawbacks. The television camera of the above type according to the invention is characterized in that in the direction of the light entering the prism system, a flat air-glass transition and a dichroic layer adjoining a flat glass surface and enclosing an angle with this transition is followed by another flat air-glass transition and a dichroic layer adjoining a flat glass surface forming an angle with the latter transition. These transitions and dichroic layers all enclose angles smaller than 30° with planes which are at right angles to the non-reflecting optical axis. In this prism system each time the light is reflected by a dichroic layer it is totally reflected by the associated glass surface adjoining air.

According to the invention it is realized that the glass length of the prism system to be traversed by the light may be comparatively small. It is also possible to reach a favorable arrangement of the camera tubes. Notably, the resulting arrangement may be comparatively compact as a result of the fact that the totally reflecting air-glass transitions are flat. As a result of this, the same zone of such an air-glass transition may serve both as an admission phase for the light in the relative part of the prism and also as totally reflecting surface for the light which is reflected by the dichroic layer associated with that air-glass transition. As a result of the fact that the air-glass transitions and the dichroic layers enclose only comparatively small angles with planes at right angles to the non-reflecting optical axis, no annoying polarisation phenomena in the light traversing them or color variations across the camera lens occur.

As is common in prism systems, the system according to the invention generally also comprises prismatic parts which are not provided with dichroic layers and the surfaces of which are not required to fulfill any totally reflecting function. This type of prism chiefly has a deflecting function with respect to the traversing light; they notably serve the purpose of making the light paths covered in the glass by various beams optically equivalent.

A favorable embodiment of the television camera according to the invention is characterized in that the air-glass transition forms one of the boundary surfaces of a thin at least substantially plane parallel space between two adjacent parts of the prism system. This at least substantially plane parallel space may for example occur between the emerging phase of an exclusively deflecting objective prism, of which the surface facing the objective also forms the entrance phase of the prism system and a prism part, the entrance phase of which serves as totally reflecting surface for the light which is reflected by the dichroic layer occurring on this latter part of the prism.

According to a further embodiment of the television camera according to the invention, in which the non-reflecting and the reflecting optical axes are flush, the other boundary of one or more of the at least substantially plane parallel spaces between two parts of the prism system is formed by a glass surface provided with a dichroic layer. In this manner, a simple embodiment of the prism system may be obtained, because two glass surfaces lying in the immediate proximity of each other may have the functions of a selectively reflecting layer and a totally reflecting layer.

According to a further embodiment of the television camera according to the invention, the totally reflecting air-glass transition, which lies nearest to the objective, is at right angles to the non-reflecting optical axis, and this transition also forms the entrance face of the prism system. This embodiment also results in a simplification of the prism system.

The prism system used in the television camera according to the invention in addition offers the possibility of not arranging all the axes of the camera tubes in one plane. A favorable embodiment of the camera according to the invention is characterized in that the sight angles between the non-reflecting optical axis on the one hand and the second flat air-glass transition and the associated glass surface provided with a dichroic layer on the other hand are rotated about the non-reflecting optical axis with respect to the sight angles between the non-reflecting optical axis on the one hand and the first flat air-glass transition and the associated glass surface provided with a dichroic layer on the other.

The invention will now be described, by way of example, with reference to the accompanying drawing. In these embodiments, a glass material having an index of refraction of 1.5 is used. Naturally, by small changes in the geometry, the use of materials having other indices of refraction is possible.

FIGURE 1 shows a first embodiment of the television camera according to the invention. The prism system used has three additional prisms which chiefly have a deflecting function in addition to two prisms, one of the surfaces of which is provided with a dichroic layer and the other adjoins air.

Figure 2:
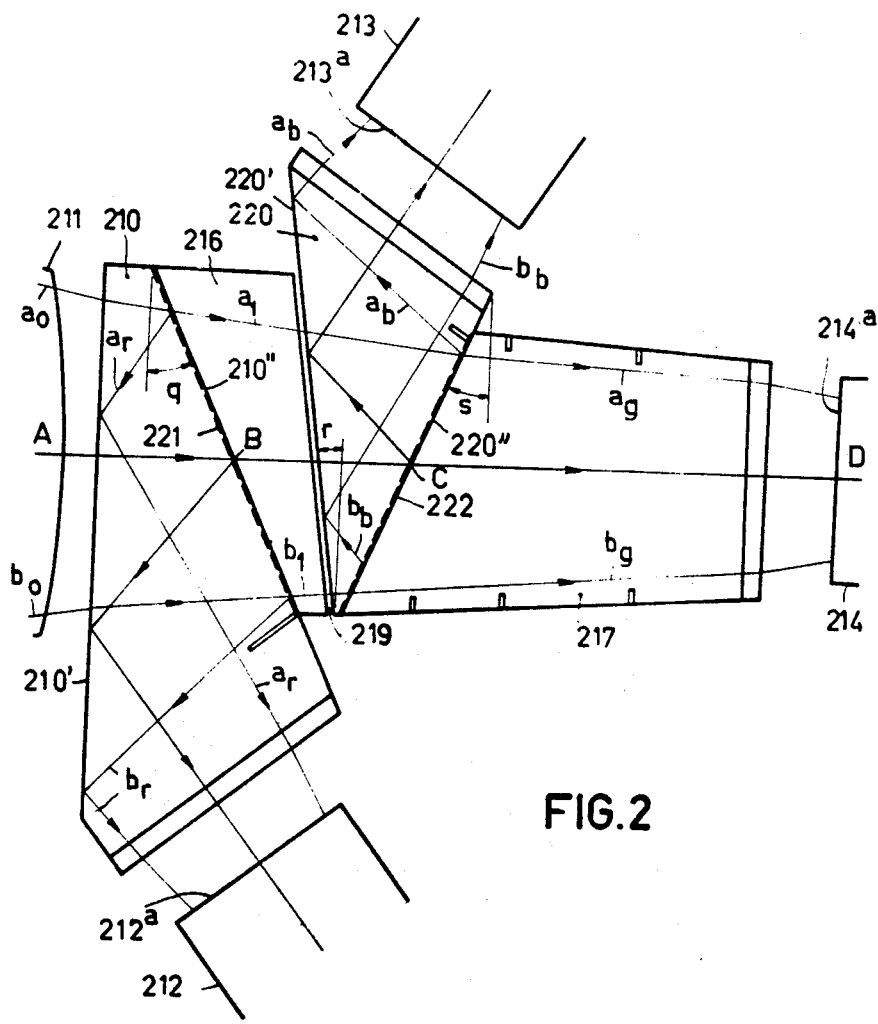

In the modified embodiment of the camera according to FIGURE 2, only two additional prisms having a deflecting function are present in addition to the two prisms, one of the surfaces of which is provided with a dichroic layer and the other adjoins air.

Figure 3:
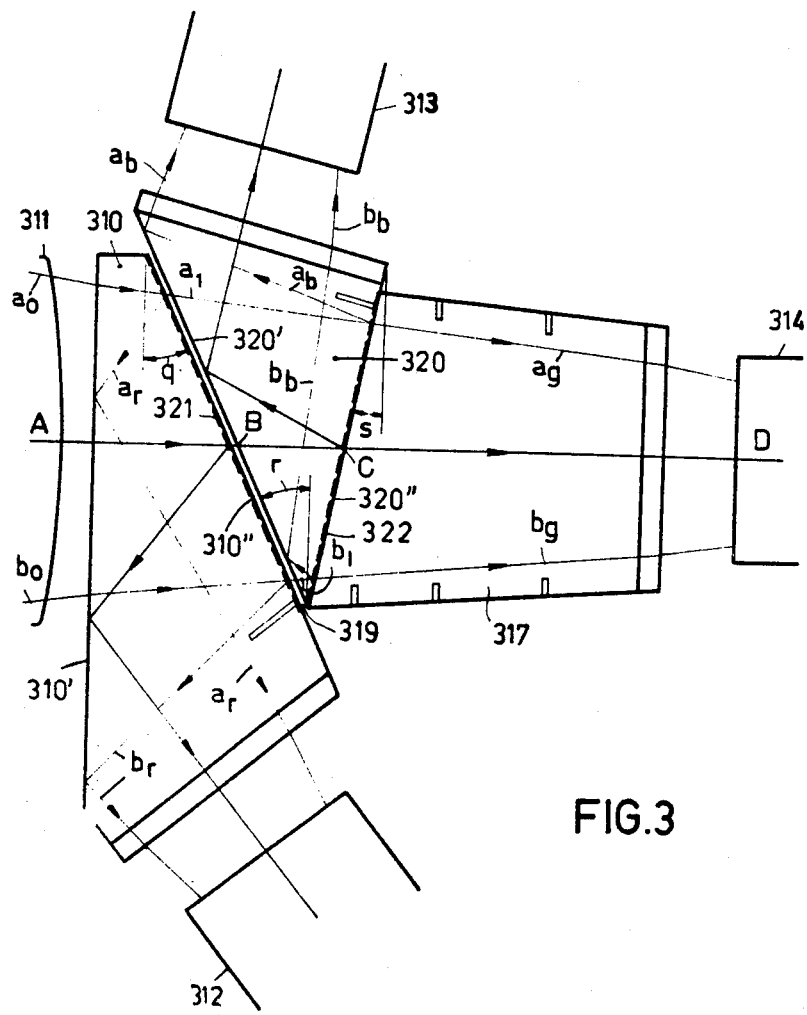

In the embodiment shown in FIGURE 3, only one single prism which has a directing or deflecting function is used in addition to two prisms, one of the surfaces of which is provided with a dichroic layer and the other with totally reflecting properties adjoins air.

In the embodiment shown in FIGURE 1, the reference numeral 111 is the light emanating side of the objective of a television camera. The emanating light is not separated and must be separated by the prism system shown in the central part of the figure into the components red, blue and green, the red light impinging on the photo-cathode 112a of the camera tube 112, the blue light on the photo-cathode 113a of the camera tube 113 and the remaining green light on the photo-cathode 114a of the camera tube 114.

The non-reflecting straight optical axis is indicated by A–B–C–D. Reflected optical axes are indicated by B–E–F and C–G–H.

The prism system comprises two prisms 110 and 120, the entrance faces 110' and 120' of which adjoin thin plane parallel spaces 118 and 119 and the emanating faces of 110" and 120" of which are provided with mutually differently colored dichroic layers 121 and 122 shown in dotted lines. The angles $p$, $q$, $r$ and $s$ are made by the boundary phases 110', 110", 120', 120" with planes intersecting the non-reflecting optical axis A–B–C–D at right angles, are all smaller than 30°.

Between the objective 111 and the prism 110, a prism 115 is provided, the entrance face 115' of which is at right angles to the non-reflecting optical axis A–B–C–D and the emanating face 115" of which forms the other boundary of the already mentioned narrow plane parallel space 118. In addition, between the emanating side 110" of the prism 110 and the prism 120, a second directing prism 116 is provided which is formed into an assembly across the boundary face 110" with the prism 110 by cementing. The above mentioned dichroic layer 121, before cementing the glass members 110 and 116, may occur both on the one and on the other prism. Between the emanating face of the prism 116 and the entrance face of the prism 120, the above mentioned narrow plane parallel space 119 is provided.

A third directing prism 117 is provided against the emanating face 120" of the prism 120 by cementing.

Red, blue and green filters, indicated by 123, 124 and 125, are cemented on the emanating faces 110''' of the prism 110, on the emanating face 120''' of the prism 120 and on the emanating face 117''' of the prism 117 respectively. The object of these filters is to complete the color selection supplied by the dichroic layers 121 and 122 even further. It has been ensured that the light paths in the present system according to the axes A–B–C–D, A–B–E–F and A–B–C–G–H are all optically equivalent.

Red light is absorbed by the dichroic filter 121 but green and blue light are passed. The dichroic filter 122 reflects blue light and passes the remaining light. This means that the light emanating from the objective 111, in as far as its red spectrum part is concerned, leaves the prism system at the emanating face 110'''. The blue part of the spectrum leaves the present system via the emanating face 120'''. The green part of the spectrum leaves the prism system via the emanating face 117'''.

The paths of rays occurring in the prism system may be followed by the light rays $a$ and $b$ shown. The unseparated light rays, indicated by $a_0$ and $b_0$, impinge upon the dichroic layer 121 after refraction in the prism 115, passage through the space 118 and refraction in the prism 110. The red part of these light rays is reflected by this layer 121 and again impinges upon the entrance face 110', of the prism 110, notably also on the same zone of this prism surface where the incident light is passed unhindered. The red light $a_r$ and $b_r$ reflected by the dichroic layer is totally reflected by the air-glass transition 110' as a result of the suitable choice of the angle between the boundary faces 110" and 110', and is then directed to the emanating face 110'''. After passing the filter 123, these red components leave the prism system and reach the photo-cathode 112a of the camera tube 112.

Those parts of the light rays $a$ and $b$ which contain the blue and green part of the spectrum, have passed the dichroic layer 121 unhindered ($a_1$ and $b_1$) and, after passage through the thin space 119, impinge upon the prism 120 where they reach the dichroic layer 122. This dichroic layer 122 is of a composition such that blue color components are reflected and the remaining light is passed. This is indicated in FIGURE 1, as far as the reflected part is concerned, by the light rays $a_b$ and $b_b$. These light rays are reflected towards the totally reflecting surface 120' of the prism 120 and reach also the same part of this surface through which the incident light has entered the prism unhindered. It may be seen from FIGURE 1 that light rays $a_b$ and $b_b$ are directed towards the emanating face 120''' of the prism 120 by this surface 120' and, after passage of the filter 124, reach the photo-cathode 113a of the camera tube 113.

Those parts of the light rays $a$ and $b$ which pass the dichroic layer 122 unhindered and consequently contain only the green color components of the light rays $a_0$ and $b_0$ ($a_1$ and $b_1$ respectively), which color components are indicated by $a_g$ and $b_g$, reach the prism 117 and, after passage of the filter 125, impinge upon the photo-cathode 114a of the camera tube 114.

The compact construction of the prism is particularly the result of the fact that the same zones of the entrance faces 110' and 120' of the prisms 110 and 120 are used for the incident light and for the totally reflecting of the light originating from the dichroic layers. As may be seen from the drawing, the prisms are provided with a few lateral grooves which are arranged so that stray reflections are avoided in the prism system.

It will be clear that one or more of the prisms shown may be constructed from several glass parts by cementing the relative parts together.

Furthermore, the possibility exists of rotating the part of the prism system which lies on the right-hand side of the plane I—I indicated by dotted lines about the non-reflecting optical axis A–B–C–D, in which case consequently a part of the prism system becomes situated above the plane of the drawing. So in this case the sight angles of the non-reflecting optical axis with the boundary faces of the prism system which are situated on the right-hand side of the plane I—I are rotated with respect to the situation shown in FIGURE 1. Such a rotation may be of advantage in connection with the arrangement of the camera tubes within a prescribed space.

The embodiment shown in FIGURE 2 differs from that shown in FIGURE 1 in that between the objective 211 of the television camera on the one hand and the photo-cathode 212a of the camera tube 212, the photo-cathode 213a of the camera tube 213 and the photo-cathode 214a of the camera tube 214 on the other, only four prisms are present. In this case the emanating faces 210" and 220" of the prisms 210 and 220 are provided with the red and blue reflecting dichroic layers 221 and 222 shown in dotted lines. The entrance faces 210' and 220' form totally reflecting faces for the light reflected by the associated dichroic layers and adjoin air. Since the entrance face 210' of the prism 210 is at right angles to the non-reflecting optical axis A–B–C–D, no objective prism is necessary in this case. The entrance face 220' of the prism 220 adjoins a narrow plane parallel space 219 between this entrance face and the emanating face of the prism 216. The prism 216 is united to the prism 210 to one assembly by cementing. In a similar manner, the prism 217 is fixed against the emanating face 220" of the prism 220.

In addition, the angles $q$, $r$ and $s$ which the emanating face 210" of the prism 210 and the entrance and emanating faces 220' and 220" respectively of the prism 220 make with this non-reflecting optical axis, are smaller than 30°.

The light rays $a$ and $b$ traverse the prism system in a manner similar to that shown in FIGURE 1; its progress in the prism system may be followed as such with reference to the indications and the arrows shown.

The embodiment shown in FIGURE 3 has been simplified even further. In this embodiment, a total of only three prisms is used. In this case also, the prism system lies between the objective 311 of the television camera and the camera tubes 312, 313 and 314 on the photocathode, upon which the light separated into the colors red, blue and green impinges.

The entrance faces 310' and 320' of the prisms 310 and 320 adjoin air. In the prism 310, the entrance face 310' is at right angles to the non-reflecting optical axis A–B–C–D. The entrance face 320' of the prism 320 is separated from the prism 310 by a narrow plane-parallel intermediate space 319 of the emanating face 310''. This emanating face 310'' simultaneously serves as a support for the dichroic layer 321 shown in dotted lines, which reflects red light and passes blue and green light. The emanating face 320'' of the prism 320 is provided with a dichroic layer 322 shown in dotted lines which reflects blue light and passes the remaining light. The entrance face of the prism 317 is cemented against the emanating side 320'' of the prism 320. The emanating face 320'' encloses an angle $q$, the entrance face 320', which is substantially parallel to said face, of the prism 320 encloses an angle $r$ with a plane at right angles to the non-reflecting optical axis. Finally, $s$ represents the angle which is made by the emanating face 320'' of the prism 320 with such a plane. The angles $q$, $r$ and $s$ are all smaller than 30°.

In FIGURE 3, the path of the light rays $a$ and $b$ is shown in a manner similar to that in FIGURES 1 and 2 and with the same indications.

It appears from FIGURE 3 that in the manner shown an extremely compact prism system may be obtained.

What is claimed is:

1. An optical system for a color television camera having a camera tube for each of a plurality of component colors of an object comprising an objective lens and between the objective lens and each tube a color separating prism system having a non-reflecting optical axis and including a plurality of prisms, said prisms being separated from one another by an air space bounded by surfaces of the prisms which intersect the non-reflecting optical axis and at least one of said prisms being separated from said objective lens by an air space, a dichroic layer adjacent each of said bounding surfaces and intersecting the non-reflecting optical axis, said bounding surfaces and said dichroic layers each forming angles of less than 30° with planes which are at right angles to the non-reflecting optical axis, said prisms being so positioned relative to one another that light reflected by a dichroic mirror is totally reflected by the adjacent bounding surface.

2. An optical system for a color television camera having a camera tube for each of a plurality of component colors of an object comprising an objective lens and between the objective lens and each tube a color separating prism system having a non-reflecting optical axis and including a plurality of prisms, said prisms being separated from one another by a thin air space bounded by parallel planar surfaces of the prisms which intersect the non-reflecting optical axis and at least one of said prisms being separated from said objective lens by an air space, a dichroic layer adjacent each of said bounding surfaces and intersecting the non-reflecting optical axis, said bounding surfaces and said dichroic layers each forming angles of less than 30° with planes which are at right angles to the non-reflecting optical axis, said prisms being so positioned relative to one another that light reflected by a dichroic mirror is totally reflected by the adjacent bounding surface.

3. An optical system for a color television camera having a camera tube for each of a plurality of component colors of an object comprising an objective lens and between the objective lens and each tube a color separating prism system having a non-reflecting optical axis and including a plurality of prisms, said prisms being separated from one another by an air space bounded by surfaces of the prisms which intersect the non-reflecting optical axis and at least one of said prisms being separated from said objective lens by an air space, a first dichroic layer in one prism adjoining one of said bounding surfaces and intersecting the non-reflecting optical axis, a second dichroic layer in another prism spaced from the other bounding surface, said bounding surfaces and said dichroic layers forming angles of less than 30° with planes which are at right angles to the non-reflecting optical axis, said prisms being so positioned relative to one another that light reflected by a dichroic mirror is totally reflected by the adjacent bounding surface.

4. An optical system for a color television camera having a camera tube for each of a plurality of component colors of an object comprising an objective lens and between the objective lens and each tube a color separating prism system having a non-reflecting optical axis and including a plurality of prisms, said prisms being separated from one another by an air space bounded by surfaces of the prisms which intersect the non-reflecting optical axis and at least one of said prisms being separated from said objective lens by an air space and having a bounding surface adjoining said air-space which is at right angles to the non-reflecting optical axis, a dichroic layer adjacent each of said surfaces bounding air spaces between prisms and intersecting the non-reflecting optical axis, said bounding surfaces and said dichroic layers forming angles of less than 30° with planes which are at right angles to the non-reflecting optical axis, said prisms being so positioned relative to one another that light reflected by a dichroic mirror is totally reflected by the adjacent bounding surface.

5. An optical system for a color television camera having a camera tube for each of a plurality of component colors of an object comprising an objective lens and between the objective lens and each tube a color separating prism system having a non-reflecting optical axis lying in a first plane and including a plurality of prisms, said prisms being separated from one another by an air space bounded by surfaces of the prisms which intersect the non-reflecting optical axis and at least one of said prisms being separated from said objective lens by an air space, a first dichroic layer adjacent one of said bounding surfaces and intersecting the non-reflecting optical axis for reflecting light of one color component along an axis lying in said first plane, a second dichroic layer adjacent the other bounding surface and intersecting said non-reflecting optical axis for reflecting light of another color component along an axis lying in a second plane forming an angle with the first plane, said bounding surfaces and said dichroic layers forming angles of less than 30° with planes which are at right angles to the non-reflecting optical axis, said prisms being so positioned relative to one another that light reflected by a dichroic mirror is totally reflected by the adjacent bounding surface.

6. An optical system for a color television camera having a camera tube for each of a plurality of component colors of an object comprising an objective lens and between the objective lens and each tube a color separating prism having a non-reflecting optical axis and including a plurality of prisms, at least two of said prisms being separated from one another by an air space bounded by surfaces of the prisms which intersect the non-reflecting optical axis and at least one of said prisms being separated from said objective lens by an air space, dichroic layers separating adjoining prisms and intersecting the non-reflecting optical axis, said bounding surfaces and said dichroic layers each forming angles of less than 30° with planes which are at right angles to the non-reflecting optical axis, said prisms being so positioned relative to one another that light reflected by a dichroic mirror is totally reflected by the adjacent bounding surface.

7. An optical system for a color television camera having a camera tube for each of a plurality of component colors of an object comprising an objective lens and between the objective lens and each tube a color separating prism system having a non-reflecting optical axis and including a plurality of prisms, one of said prisms being spaced from and having a bounding surface facing the objective lens which is at right angles to the non-reflecting optical axis, said prism being separated from another by an air space bounded by surfaces of the prisms which intersect the non-reflecting optical axis and at least two other prisms separated from one another by an air space bounded by surfaces of the prisms which intersect the non-reflecting optical axis, first and second dichroic layers separating adjoining prisms and intersecting the non-reflecting optical axis, said bounding surfaces and said dichroic layers each forming angles of less than 30° with planes which are at right angles to the non-reflecting optical axis, said prisms being so positioned relative to one another that light reflected by a dichroic mirror is totally reflected by the adjacent bounding surface.

8. An optical system for a color television camera having a camera tube for each of a plurality of component colors of an object comprising an objective lens and between the objective lens and each tube a color separating prism system having a non-reflecting optical axis and including a plurality of prisms, said prisms being separated from one another by an air space bounded by surfaces of the prisms which intersect the non-reflecting optical axis and at least one of said prisms being separated from said objective lens by an air space, a dichroic layer adjacent each of said bounding surfaces and intersecting the non-reflecting optical axis, said bounding surfaces and said dichroic layers each forming angles of less than 30° with planes which are at right angles to the non-reflecting optical axis, said prisms being so positioned relative to one another that light reflected by a dichroic mirror is totally reflected by the adjacent bounding surface, and a color filter selective to a given color component interposed between each camera tube and the prism system.

9. An optical system for a color television camera having a camera tube for each of a plurality of component colors of an object comprising an objective lens and between the objective lens and each tube a color separating prism system having a non-reflecting optical axis and including a first and second pair of prisms, said first pair of prisms being separated from the second pair by an air space bounded by surfaces of the prisms which intersect the non-reflecting optical axis and said first pair being separated from said objective lens by an air space, a dichroic layer separating each pair of prisms and intersecting the non-reflecting optical axis, said bounding surfaces and said dichroic layers each forming angles of less than 30° with planes which are at right angles to the non-reflecting optical axis, said prisms being so positioned relative to one another that light reflected by a dichroic mirror is totally reflected by the adjacent bounding surface.

10. An optical system for a color television camera having a camera tube for each of a plurality of component colors of an object comprising an objective lens and between the objective lens and each tube a color separating prism system having a non-reflecting optical axis and including a first and second pair of prisms, said first pair of prisms being separated from the second pair by an air space bounded by surfaces of the prisms which intersect the non-reflecting optical axis, a prism interposed between the first pair of prisms and the objective lens and separated from said first pair of prisms by an air space, a dichroic layer separating each pair of prisms and intersecting the non-reflecting optical axis, said bounding surfaces and said dichroic layers each forming angles of less than 30° with planes which are at right angles to the non-reflecting optical axis, said prisms being so positioned relative to one another that light reflected by a dichroic mirror is totally reflected by the adjacent bounding surface.

References Cited by the Examiner

UNITED STATES PATENTS 2,672,072  3/54  Sachtleben et al. _____ 95—12.20 X

JEWELL H. PEDERSEN, *Primary Examiner.*

DELBERT B. LOWE, FREDERICK M. STRADER, *Examiners.*